(12) United States Patent
Tsukao et al.

(10) Patent No.: US 11,135,807 B2
(45) Date of Patent: Oct. 5, 2021

(54) FILLER-CONTAINING FILM

(71) Applicant: DEXERIALS CORPORATION, Tokyo (JP)

(72) Inventors: Reiji Tsukao, Utsunomiya (JP); Shinichi Hayashi, Utsunomiya (JP); Seiichiro Shinohara, Kanuma (JP); Yusuke Tanaka, Saitama (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/463,856

(22) PCT Filed: Nov. 20, 2017

(86) PCT No.: PCT/JP2017/041681
§ 371 (c)(1),
(2) Date: May 24, 2019

(87) PCT Pub. No.: WO2018/101105
PCT Pub. Date: Jun. 7, 2018

(65) Prior Publication Data
US 2019/0337262 A1    Nov. 7, 2019

(30) Foreign Application Priority Data

Dec. 1, 2016  (JP) .............................. JP2016-233713
Aug. 22, 2017  (JP) .............................. JP2017-159829

(51) Int. Cl.
*B32B 7/02* (2019.01)
*C08L 35/02* (2006.01)
(Continued)

(52) U.S. Cl.
CPC ................ *B32B 7/02* (2013.01); *B32B 27/20* (2013.01); *B32B 27/308* (2013.01); *B32B 27/42* (2013.01);
(Continued)

(58) Field of Classification Search
CPC ........ B32B 2264/105; B32B 2307/202; B32B 2457/00; B32B 27/20; B32B 27/308;
(Continued)

(56) References Cited

U.S. PATENT DOCUMENTS

2009/0056995 A1    3/2009  Maeda et al.
2014/0360573 A1    12/2014 Nishioka et al.
(Continued)

FOREIGN PATENT DOCUMENTS

JP    2006-015680 A    1/2006
JP    2006-233202 A    9/2006
(Continued)

OTHER PUBLICATIONS

Jan. 23, 2018 International Search Report issued in International Patent Application No. PCT/JP2017/041681.
(Continued)

*Primary Examiner* — Lawrence D Ferguson
(74) *Attorney, Agent, or Firm* — Oliff PLC

(57) ABSTRACT

A filler-containing film has a structure in which fillers are held in a binder resin layer. The average particle diameter of the fillers is 1 to 50 μm, the total thickness of the resin layer is 0.5 times or more and 2 times or less the average particle diameter of the fillers, and the ratio Lq/Lp of, relative to the minimum inter-filler distance Lp at one end of the filler-containing film in a long-side direction, a minimum inter-filler distance Lq at the other end at least 5 m away from the one end in the film long-side direction is 1.2 or less. The fillers are preferably arranged in a lattice form.

22 Claims, 5 Drawing Sheets

(51) Int. Cl.
*C08J 5/18* (2006.01)
*H01F 27/32* (2006.01)
*H01R 11/01* (2006.01)
*H01R 43/00* (2006.01)
*B32B 27/20* (2006.01)
*B32B 27/30* (2006.01)
*B32B 27/42* (2006.01)
*C08L 61/06* (2006.01)

(52) U.S. Cl.
CPC ............... *C08J 5/18* (2013.01); *C08L 35/02* (2013.01); *C08L 61/06* (2013.01); *H01F 27/32* (2013.01); *H01R 11/01* (2013.01); *H01R 43/00* (2013.01); *B32B 2264/105* (2013.01); *B32B 2307/202* (2013.01); *B32B 2457/00* (2013.01); *C08J 2335/02* (2013.01); *C08J 2361/06* (2013.01); *C08J 2461/06* (2013.01); *C08J 2463/00* (2013.01); *C08L 2203/16* (2013.01); *C08L 2203/20* (2013.01)

(58) Field of Classification Search
CPC ........ B32B 27/42; B32B 7/02; C08J 2335/02; C08J 2361/06; C08J 2367/02; C08J 2461/06; C08J 2463/00; C08J 2471/12; C08J 5/18; C08J 7/042; C08J 7/0427; C08L 2203/16; C08L 2203/20; C08L 35/02; C08L 61/06; C09J 133/04; H01F 27/32; H01R 11/01; H01R 43/00; H01R 4/04
See application file for complete search history.

(56) References Cited

U.S. PATENT DOCUMENTS

| 2016/0270225 A1 | 9/2016 | Shinohara |
| 2017/0323701 A1 | 11/2017 | Ishimatsu et al. |

FOREIGN PATENT DOCUMENTS

| JP | 2006-321223 A | 11/2006 |
| JP | 2009-074020 A | 4/2009 |
| JP | 2010-033793 A | 2/2010 |
| JP | 2010-067360 A | 3/2010 |
| JP | 2013-103368 A | 5/2013 |
| JP | 2014-183266 A | 9/2014 |
| JP | 2015-138904 A | 7/2015 |
| JP | 2015-171773 A | 10/2015 |
| JP | 2016-131152 A | 7/2016 |
| JP | 2016-183224 A | 10/2016 |
| JP | 6187665 B1 | 8/2017 |
| WO | 2013/118729 A1 | 8/2013 |
| WO | 2015/076234 A1 | 5/2015 |
| WO | 2016/068168 A1 | 5/2016 |

OTHER PUBLICATIONS

Jan. 23, 2018 Written Opinion issued in International Patent Application No. PCT/JP2017/041681.
Dec. 17, 2018 International Preliminary Report on Patentability issued in International Patent Application No. PCT/JP2017/041681.
Jun. 22, 2021 Office Action issued in Japanese Patent Application No. 2017-159829.

(X-X Cross-Sectional View)

FILLER-CONTAINING FILM

TECHNICAL FIELD

The present invention relates to a filler-containing film.

BACKGROUND ART

Filler-containing films have been used in a wide variety of use applications such as matte films, capacitor films, optical films, labeling films, antistatic films, and anisotropic conductive films (Patent Literature 1, Patent Literature 2, Patent Literature 3, and Patent Literature 4).

The filler-containing film is generally produced as a wound body.

However, when the filler-containing film is configured as a wound body, phenomena in which the resin serving as the binder for the filler protrudes and the resins protruding from resin layers of the upper and lower films overlapping each other are joined in the wound body easily occur. In particular, on the winding core side of the wound body, this problem becomes noticeable due to the tightening of the winding.

CITATION LIST

Patent Literature

Patent Literature 1: Japanese Patent Application Laid-Open No. 2006-15680
Patent Literature 2: Japanese Patent Application Laid-Open No. 2015-138904
Patent Literature 3: Japanese Patent Application Laid-Open No. 2013-103368
Patent Literature 4: Japanese Patent Application Laid-Open No. 2014-183266

SUMMARY OF INVENTION

Technical Problem

To cope with the above-mentioned problems, the present invention has an object of reducing the protrusion of the resin which is the binder for a filler in a filler-containing film and more effectively expressing the functions of the filler-containing film.

Solution to Problem

The present inventor has found that, when the average particle diameter of the fillers and the layer thickness of the binder resin layer holding the fillers and the layer thickness of the second resin layer laminated on the binder resin layer as necessary are made approximately equal to suppress the fluctuation of the distance between the fillers depending on the position of the filler-containing film in the long-side direction, it is possible to suppress the protrusion of the resin in the case of a wound body and to effectively extract the function of the filler, thereby arriving at the present invention.

The present invention provides a long-length filler-containing film in which fillers are held in a binder resin layer, wherein an average particle diameter of the fillers is 1 to 50 µm, a total thickness of the resin layer is 0.5 times or more and 2 times or less the average particle diameter of the fillers, and a ratio Lq/Lp of, relative to a minimum inter-filler distance Lp at one end of the filler-containing film in a long-side direction, a minimum inter-filler distance Lq at the other end at least 5 m away from the one end in the film long-side direction is 1.2 or less. In particular, the present invention provides, as a preferred aspect of the filler-containing film, a filler-containing film in which the filler is a conductive particle and which is used as an anisotropic conductive film. In the filler-containing film, the fillers are preferably arranged in a lattice form.

The present invention also provides a film bonded body in which the above-mentioned filler-containing film is bonded to an article, a connection structure in which a first article and a second article are connected via the above-mentioned filler-containing film, and in particular, a connection structure in which a first electronic component and a second electronic component are anisotropically conductively connected via the filler-containing film used as an anisotropic conductive film. Further, the present invention provides a method for producing a connection structure including pressure bonding a first article and a second article via the above-mentioned filler-containing film, and a method for producing a connection structure in which a first electronic component and a second electronic component are adopted as the first article and the second article, respectively, and a connection structure in which the first electronic component and the second electronic component are anisotropically conductively connected to each other is produced by thermocompression bonding the first electronic component and the second electronic component via the filler-containing film (i.e., an anisotropic conductive film) where the filler is a conductive particle. In these inventions, it is preferable that the total of the heights of opposing terminals of the first electronic component and the second electronic component is set to 2 times or less the size of the conductive particles in the anisotropic conductive film.

Advantageous Effects of Invention

According to the filler-containing film of the present invention, it is possible to reduce the protrusion of the resin of the binder resin layer and to more effectively express the functions possessed by the filler-containing film according to the use applications of the filler-containing film. For example, when the filler-containing film serves as a matte film, a uniform matte effect can be obtained, and when the filler-containing film serves as an anisotropic conductive film, the film is suitable for connecting electronic components in which the terminal height is reduced to, for example, 3 µm or less.

DESCRIPTION OF EMBODIMENTS

Figure 1A:
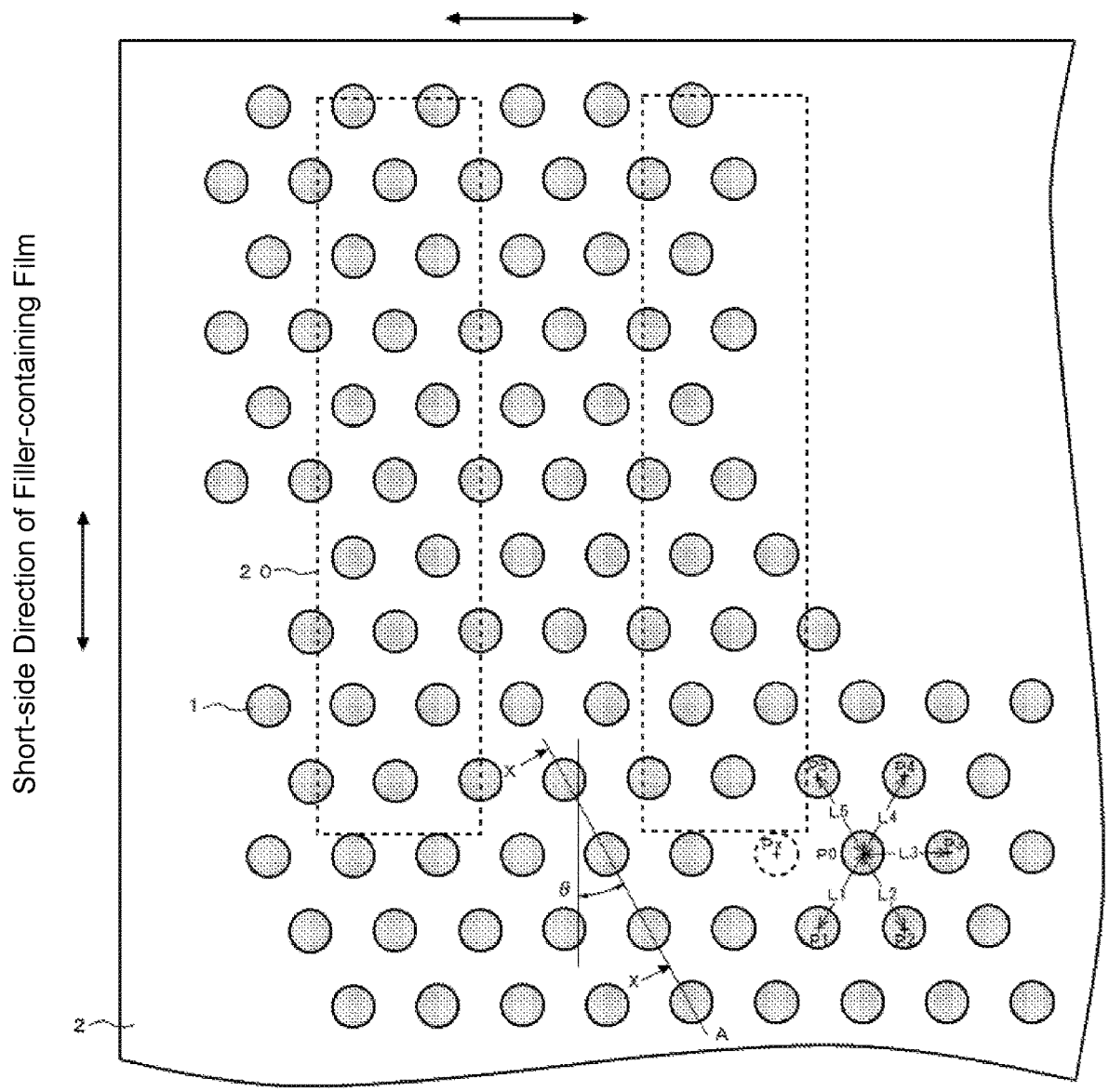
FIG. 1A is a plan view describing a disposition of fillers in a filler-containing film 10A.

A filler-containing film of the present invention will be described below in detail with reference to the drawings. Note that the same reference numerals in the drawings denote the same or equivalent components.

<Overall Configuration of Filler-Containing Film>

Figure 1B:
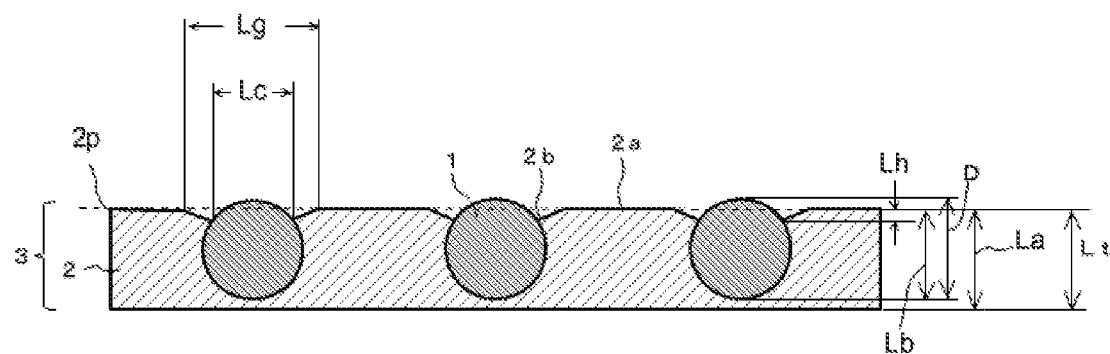
FIG. 1B is a cross-sectional view of the filler-containing film 10A.

FIG. 1A is a plan view describing a disposition of fillers in a filler-containing film 10A according one embodiment of the present invention, and FIG. 1B is a cross-sectional view taken along line X-X of FIG. 1A.

The filler-containing film 10A is a long-length film, and is formed of a filler distributed layer 3 in which fillers 1 arranged in a hexagonal lattice are held by a binder resin layer 2. The average particle diameter of the fillers 1 is 1 to 50 In the filler-containing film 10A, the layer thickness La of the binder resin layer 2 is equal to the layer thickness Lt of the resin layer of the filler-containing film 10A, and the layer thickness La is 0.5 times to 2 times, preferably 0.7 times to 1.3 times, the average particle diameter of the fillers 1, and is substantially equal to the average particle diameter of the fillers 1. Also, the disposition of the fillers 1 is preferably evenly disposed as described later.

<Filler>

The filler 1 is appropriately selected according to use applications of the filler-containing film as well as according to the performance required for the use application such as hardness and optical performance from known inorganic fillers (metal, metal oxide, metal nitride, etc.), organic fillers (resin particles, rubber particles, etc.), and fillers in which an organic material and an inorganic material are mixed (for example, particles in which a core is formed of a resin material and the surface thereof is metal-plated (metal-coated resin particles), particles in which insulating fine particles are attached to the surface of conductive particles, surfaces of conductive particles are insulated, etc.). For example, in the case of an optical film or a matte film, a silica filler, a titanium oxide filler, a styrene filler, an acrylic filler, a melamine filler, various titanates, or the like can be used. In the case of a capacitor film, titanium oxide, magnesium titanate, zinc titanate, bismuth titanate, lanthanum oxide, calcium titanate, strontium titanate, barium titanate, barium zirconate titanate, lead zirconate titanate, mixtures thereof, or the like can be used. In the case of an adhesive film, polymer-based rubber particles, silicone rubber particles, or the like can be contained. In the case of an anisotropic conductive film, conductive particles are contained. Examples of the conductive particles may include metal particles of nickel, cobalt, silver, copper, gold, palladium, and the like, alloy particles of solder and the like, metal-coated resin particles, and metal-coated resin particles having insulating fine particles attached to the surface thereof. Two or more types may be used in combination. Among these, the metal-coated resin particles are preferable from the viewpoint of facilitating the contact with the terminal maintained by repulsion of the resin particles after the metal-coated resin particles are connected, and stabilizing the conduction performance. Further, the surface of the conductive particles may be subjected to an insulating treatment, which does not hinder the conduction characteristics, by a known technique. The fillers mentioned above for each use application are not limited to the particular use application, and may be contained in filler-containing films for other use applications as necessary. In addition, in the filler-containing film for each use application, two or more types of fillers can be used in combination as necessary.

The shape of the filler is appropriately selected and determined from a spherical shape, an elliptical sphere, a columnar shape, a needle shape, a combination thereof, and the like according to the use application of the filler-containing film. A spherical shape is preferable from the viewpoint of facilitating confirmation of the filler disposition and maintaining the uniform state. In particular, when the filler-containing film is configured as an anisotropic conductive film, it is preferable that the conductive particles which are fillers be substantially perfect spheres. For example, in producing an anisotropic conductive film in which conductive particles are arranged using a transfer mold as described in Japanese Patent Application Laid-Open No. 2014-60150, when conductive particles of a substantially perfect sphere are used as the conductive particles, the conductive particles roll smoothly on the transfer mold, so that the conductive particles can be filled in predetermined positions on the transfer mold with high precision. Therefore, the conductive particles can be precisely disposed.

<Particle Diameter of Filler>

The particle diameter of the filler is appropriately determined according to the use application of the filler-containing film. However, in the present invention, in order to substantially equalize the average particle diameter of the fillers with the total thickness of the resin layer in the filler-containing film, it is preferable to set the particle diameter to 1 μm or more and 50 μm or less in terms of film handleability or the like. In particular, in the case where the filler-containing film is configured as an anisotropic conductive film (when the filler is a conductive particle), it is preferable that the particle diameter be set to 1 μm or more and 30 μm or less from the viewpoints of coping with the fluctuation in wiring height and wiring flatness, and suppressing the increased conduction resistance and the occurrence of a short circuit. In particular, it is preferable that the particle diameter be set to 2.5 μm or more and 20 μm or less when the terminals whose terminal thickness is reduced to about 3 μm or less are connected. In this case, at least one of the terminals is preferably a terminal such as those for an IC chip and an FPC in anisotropic conductive connection (it is preferably an electronic component having a shape in which the top of the terminal protrudes from the substrate on which the terminal is provided). Examples of the material for the terminal may include those used for publicly known electronic parts, such as gold, copper, and tin.

The particle diameter of the fillers can be measured by a general particle size distribution measuring apparatus, and the average particle diameter can also be determined using a particle size distribution measuring apparatus. FPIA-3000 (Malvern Panalytical Ltd.) may be mentioned as one example of the particle size distribution measuring apparatus. In this case, it is desirable to set the number of samples for measuring the particle diameter to 200 or more, preferably 1000 or more, and more preferably 5000 or more. There may be a case where a technique of determining the particle diameter and the average particle diameter by observing with a metallurgical microscope or a scanning electron microscope a specimen in which the fillers are dispersed on a flat plate such a glass plate or a specimen to which the fillers mixed and kneaded in a curable resin composition and monodispersed is applied is preferable. This is because, in the case of one having an aspect ratio, the size can be determined from the Z axis (focus adjustment) of the observation device or the like. Moreover, when the shape of the filler is not spherical, the maximum length or the diameter of the shape simulating a spherical shape based on a planar image or a cross-sectional image of the filler-containing film can be used as the particle diameter of the fillers to determine the average particle diameter.

<Arrangement of Filler>

In the filler-containing film of the present invention, the disposition of the fillers is arbitrary as long as the conditions regarding the total thickness of the resin layer described later and the minimum inter-filler distance are satisfied, but it is preferable that the fillers be arranged in a lattice form from the viewpoint of obtaining the effects of the invention. In the filler-containing film 10A shown in FIG. 1A, the fillers 1 are regularly arranged in a lattice form in a plan view. Arranging the fillers in a lattice form relatively facilitates the disposition of the fillers at equal intervals with the fillers not being in contact with each other. Therefore, it is possible to prevent the generation of a portion where resin protrusion and bleeding are likely to occur due to the tightening of a wound roll of the filler-containing film. Therefore, even if resin protrusion or bleeding occurs at a certain site, the resin protrusion or bleeding can be prevented from further spreading to the upper and lower resin layers overlapped by winding. In addition, even if the disposition of the fillers is arbitrary, the same effect may be obtained.

Herein, examples of the aspects of lattice arrangements may include, in addition to a hexagonal lattice shown in FIG. 1A, a rectangular lattice, a rhombic lattice, a square lattice, and other rectangular lattices. Of these, a hexagonal lattice, a square lattice or a rhombic lattice (i.e., a diamond lattice) is preferable because the uniform disposition of the respective fillers is achieved. In the present invention, the arrangement in the lattice form also includes an aspect in which groups of fillers are arranged in a lattice form. The fillers forming this group preferably have regularity within the group. Moreover, the arrangement in which the fillers are partly and regularly pulled out from the fillers arranged in a lattice form is also included. The removal of the filler can be confirmed by regularly existing the removal in a predetermined direction of the film within a range in which the effects of the filler-containing film of the present invention can be obtained. Also, by repeatedly causing the filler to be removed in the long-side direction of the film, or by gradually increasing or decreasing the portion where the filler is removed in the long-side direction of the film, lot management becomes possible. Furthermore, traceability (property that enables tracing) can be imparted to the filler-containing film and the connection structure using the same. This is also effective for preventing counterfeiting, authenticity determination, and unauthorized use of a filler-containing film or a connection structure using the same.

In the present invention, the regularity of the filler arrangement in the lattice form described above is stable regardless of the position of the filler-containing film in the long-side direction, and when the minimum inter-filler distance at one end of the filler-containing film in the long-side direction is Lp and the minimum inter-filler distance at the other end at least 5 m away from the one end in the film long-side direction is Lq, the ratio Lq/Lp of these is 1.2 or less. Ten or more, preferably 20 or more, and more preferably 100 or more shortest distances between fillers arranged in a lattice form at each of one end and the other end are measured to determine the minimum inter-filler distance Lp and the minimum inter-filler distance Lq at the other end, thereby determining the ratio Lq/Lp.

Further, in the present invention, as a parameter of the uniform disposition of the fillers 1, it is preferable to set the ratio (Lmax/Lmin) obtained as follows to 1 or more and 1.2 or less. That is, 10 or more, preferably 20 or more regions are arbitrarily extracted from the entire film, or an arbitrary filler P0 and three fillers P1, P2, and P3 are selected in order of proximity to the arbitrary filler P0 in respective regions which each has a length of 1% or more the entire length of the film, preferably of 2% or more the entire length thereof, it is preferable that the ratio (Lmax/Lmin) (FIG. 1A) of the maximum distance (Lmax) to the minimum distance (Lmin) among the distances L1, L2, and L3 between each of the three fillers P1, P2, and P3 and the filler P0 be 1.0 or more and 1.2 or less, preferably 1.1 or less, and more preferably 1.05 or less in average. In particular, if the fillers 1 are arranged in a hexagonal lattice, when the ratio (Lmax/Lmin) between the largest distance (Lmax) and the smallest distance (Lmin) is determined by selecting five fillers P1, P2, P3, P4, and P5 in order of proximity to an arbitrary filler P0 in the same manner as described above, it is preferable that the average thereof be 1.0 or more and 1.1 or less. When the average of the ratios (Lmax/Lmin) between the largest distance (Lmax) and the smallest distance (Lmin) is determined by selecting three fillers P1, P2, and P3, preferably five fillers P1, P2, P3, P4, and P5 in order of proximity to an arbitrary filler P0 in the same manner as described above, the average is 1.0 or more and 1.2 or less, preferably 1.1 or less, and more preferably 1.05 or less. In this case, the disposition of the fillers may not be in a lattice arrangement. It is preferable that the same numerical range is set for P1 adjacent to the arbitrary filler P0, it is more preferable that the same numerical range is set for P2, and it is further preferable that the same numerical value range is set for P3. With these conditions satisfied, it can be said that it is a substantially uniformly distributed state over the surface.

When the fillers are arranged in a hexagonal lattice, square lattice or rhombic lattice (diamond lattice), the above-mentioned ratio (Lmax/Lmin) is 1 in terms of design, but actually, when the filler-containing film is produced, there is a concern that minute positional deviation may occur. If the filler-containing film is formed as a wound body, fine positional deviation may also occur due to the tightened thickness of the filler-containing film. On the other hand, the upper limit of the above-mentioned ratio (Lmax/Lmin) is an allowable range of the displacement of the fillers in the present invention. In the present invention, by keeping this allowable range low, the fillers are placed in a non-contact state with each other and in an evenly disposed state, thereby preventing resin protrusion and bleeding. In addition, when the filler is a conductive particle and the filler-containing film is configured as an anisotropic conductive film, pressure can be uniformly applied to the respective conductive particles 1 at the time of anisotropic conductive connection, thereby practically reducing variation in conduction resistance as well as preventing short circuits.

In the filler-containing film, it is desirable that the ratio (Lmax/Lmin) falling within the above-mentioned range be realized at any part of the film. This can be easily confirmed by examining the ratio (Lmax/Lmin) at both the one end and the other end of the filler-containing film in the long-side direction. In particular, in the case where the filler-containing film is a wound body wound around a winding core and the diameter of the winding core is defined as 2R, the ratio (Lmax/Lmin) should be 1.0 or more and 1.2 or less in the region with the length of 2πR from the one end on the winding core side of the filler-containing film (that is, in the region of the circumferential length of the winding core). In this region, the tension due to tightening is most likely to be applied, and the ratio (Lmax/Lmin) is likely to fluctuate. The end on the winding core side of the filler-containing film refers to, for example, a portion where the lead portion of the winding core and the filler-containing film (or the base film supporting the same) are joined to each other. The other end refers to a withdrawal position of the film which is formed in a wound body using a winding core. The length from one end to the other end varies depending on the length of the filler-containing film. But when the ratio (Lmax/Lmin) at the other end is examined, it is preferable that the average of the ratios (Lmax/Lmin) at ten or more places arbitrarily selected from the length of one or more circumferences of the outermost periphery be 1.0 or more and 1.2 or less.

In the filler-containing film of the present invention, the ratio of the fillers present in a non-contact state with each other is 95% or more, preferably 98% or more, and more preferably 99.5% or more by arbitrarily disposing the fillers or arranging the fillers in a lattice form as described above.

As a method for disposing the fillers in a non-contact state with each other while suppressing the slight positional displacement as described above, it is preferable to prepare a mold in which portions where the fillers are to be disposed are defined in advance when a filler-containing film as described later is produced, dispose the fillers in the portions, and transfer the fillers to a binder resin layer.

When the filler-containing film is configured as an anisotropic conductive film, the lattice axis of the fillers arranged in a lattice form may be parallel to the long-side direction of the anisotropic conductive film or may intersect with the long-side direction of the anisotropic conductive film. This can be determined according to a width of the terminal to be connected, a terminal pitch, and the like. In the case where the filler-containing film is configured as an anisotropic conductive film for fine pitches, for example, it is preferable to incline at least one lattice axis A of the conductive particles 1 with respect to the long-side direction of the anisotropic conductive film 10A as shown in FIG. 1A, and to make the angle θ formed between the long-side direction of the terminal 20 connected by the anisotropic conductive film 10A and the lattice axis A be 16° to 74°. Even in use applications other than the anisotropic conductive film, the effect of stabilizing the captured state is expected by inclining in this manner.

<Number Density and Area Occupancy Rate of Fillers>

The number density and area occupancy rate of the fillers can be determined according to the use applications of the filler-containing film, the particle diameter of the fillers, and the like as appropriate. For example, when the filler is a conductive particle and the filler-containing film is configured as an anisotropic conductive film, if the number density of conductive particles is too small, it is impossible to cope with the connection of electronic components with fine pitches whereas, if the number density is too large, short circuit may occur. Thus, in the case of having a particle diameter of 1 to 30 μm, the number density is preferably 30 to 72000 particles/mm$^2$, and more preferably 50 to 50000 particles/mm$^2$. The area occupancy rate of the film in a plan view (number density of fillers×average area per filler×100) is also preferably 0.1 to 35% for the same reason as the number density of conductive particles, and is more preferably 0.5 to 30%. The production conditions as a filler-containing film other than the anisotropic conductive film are also substantially the same as that in the case of the anisotropic conductive film (because they are not significantly different from each other). Thus, it may be considered that the conditions for the number density and area occupancy rate of the fillers are almost the same due to the design restrictions and the like. When the filler-containing film is configured as a wound body, the lower limit is preferably 6% or more, and more preferably 12% or more, because resin protrusion can be suppressed with the high area occupancy rate of the fillers beyond a certain extent. (With the same reasons as described above, the upper limit is preferably 35% or less, and more preferably 30% or less.) When it is 35% or more, there is a concern that the fillers may come in contact with others and the independence may be lost. As described above, the number density and the area occupancy rate are not limited to these ranges.

<Binder Resin Layer>

(Viscosity of Binder Resin Layer)

The minimum melt viscosity of the binder resin layer 2 is not particularly limited, and can be appropriately determined according to the use application of the filler-containing film, the production method of the filler-containing film, and the like. For example, the minimum melt viscosity can be set to about 1000 Pa·s depending on the production method of the filler-containing films as long as the concaves 2b and 2c described later can be formed. On the other hand, when a method of holding the fillers in a predetermined disposition on the surface of the resin layer and pushing the fillers into the resin layer is performed as a production method of the filler-containing film, it is preferable to set the minimum melt viscosity of the resin to 1100 Pa·s or more from the viewpoint of enabling the resin layer to form a film.

Figure 2:
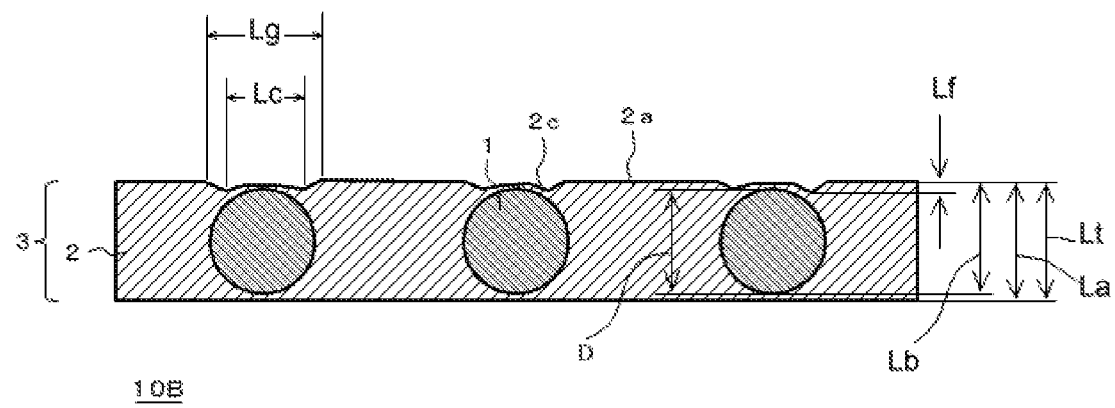
FIG. 2 is a cross-sectional view of a filler-containing film 10B.

In addition, as will be described later in the method for producing the filler-containing film, the minimum melt viscosity of the binder resin layer 2 is preferably 1500 Pa·s or more, more preferably 2000 Pa·s or more, further preferably 3000 to 15000 Pa·s, and further more preferably 3000 to 10000 Pa·s, in terms of forming a concave 2b around the exposed part of the filler 1 pushed into the binder resin layer 2 as shown in FIG. 1B and forming a concave 2c right above the filler 1 pushed into the binder resin layer 2 as shown in FIG. 2. The minimum melt viscosity can be determined by using, for example, a rotary rheometer (manufactured by TA Instruments), maintaining the measurement pressure being constant at 5 g, and using a measurement plate having a diameter of 8 mm. More specifically, it can be determined by setting the rate of temperature increase to 10° C./min, the measurement frequency to 10 Hz, and the load variation to 5 g with respect to the measurement plate in a temperature range of 30 to 200° C.

When the minimum melt viscosity of the binder resin layer 2 is set to a high viscosity of 1500 Pa·s or more, unnecessary movement of the fillers at the time of pressure bonding of the filler-containing film to the article can be suppressed. In particular, in the case where the filler-containing film is configured as an anisotropic conductive film, it is possible to prevent the conductive particles to be sandwiched between the terminals at the time of anisotropic conductive connection from flowing by the resin flow.

In addition, when the filler distributed layer 3 of the filler-containing film 10A is formed by pushing the fillers 1 into the binder resin layer 2, the binder resin layer 2 at the time of pushing the fillers 1 thereinto is a viscous member having a high viscosity such that the binder resin layer 2 is plastically deformed to form a concave 2b (FIG. 1B) in the binder resin layer 2 around the filler 1 when the fillers 1 are pushed into the binder resin layer 2 so as to be exposed from the binder resin layer 2, or is a viscous member having a high viscosity such that a concave 2c (FIG. 2) is formed in the surface of the binder resin layer 2 right above the filler 1 when the fillers 1 are pushed into the binder resin layer 2 to be embedded in the binder resin layer 2 without being exposed therefrom. Therefore, the lower limit of the viscosity of the binder resin layer 2 at 60° C. is preferably 3000

Pa·s or more, more preferably 4000 Pa·s or more, and further preferably 4500 Pa·s or more, and the upper limit thereof is preferably 20000 Pa·s or less, more preferably 15000 Pa·s or less, and further preferably 10000 Pa·s or less. This measurement is performed by the same measurement method as that for the minimum melt viscosity of the binder resin layer, and the viscosity can be determined by extracting a value at a temperature of 60° C.

Specifically, the viscosity of the binder resin layer 2 at the time of pushing the fillers 1 thereinto is determined according to the shape and depth of the concave 2b or 2c to be formed, or the like, and the lower limit thereof is preferably 3000 Pa·s or more, more preferably 4000 Pa·s or more, and further preferably 4500 Pa·s or more, and the upper limit thereof is preferably 20000 Pa·s or less, more preferably 15000 Pa·s or less, and further preferably 10000 Pa·s or less. Such a viscosity is preferably exhibited at 40 to 80° C., more preferably at 50 to 60° C.

As described above, the formation of the concave 2b (FIG. 1B) around the filler 1 exposed from the binder resin layer 2 reduces the resistance received from the resin due to the flattening of the fillers 1 that occurs when the filler-containing film is pressure bonded to an article, compared to the case where there is no concave 2b. Therefore, in the case where the filler-containing film is configured as an anisotropic conductive film, the conductive particles are easily sandwiched by the terminals at the time of anisotropic conductive connection, so that the conduction performance and also the capturing properties are improved.

In addition, since the concave 2c (FIG. 2) is formed in the surface of the binder resin layer 2 right above the filler 1 which is embedded without being exposed from the binder resin layer 2, the pressure at the time of pressure bonding of the filler-containing film to an article tends to concentrate on the filler 1 compared to the case where there is no concave 2c. Therefore, in the case where the filler-containing film is configured as an anisotropic conductive film, the conductive particles are easily sandwiched by the terminals at the time of anisotropic conductive connection, so that the capturing properties are improved and the conduction performance is also improved. The filler-containing film of the present invention has a relatively small amount of resin, and the presence of the above-mentioned concave 2b and concave 2c facilitates holding of the fillers between articles (in the case of an anisotropic conductive film, conductive particles and terminals or electrodes). Thus, the effect of suppressing the thrust at the time of pressure bonding is expected. The independence of the captured filler after pressure bonding is also expected to be more likely to be maintained before and after pressure bonding. This is because the amount of flowing resin itself is relatively small.

<"Inclination" or "Undulation" Instead of Concave>

The "concave" 2b and 2c of the filler-containing film (anisotropic conductive film) as shown in FIG. 1B and FIG. 2 can also be described in terms of "inclination" or "undulation." A description thereof will next be given with reference to the drawings.

The filler-containing film (anisotropic conductive film which) 10A is composed of a filler distributed layer 3 of fillers 1 such as conductive particles (FIG. 1B). In the filler distributed layer 3, the fillers 1 are regularly distributed in a state where they are exposed from one surface of the binder resin layer 2. In a plan view of the film, the fillers 1 are not in contact with each other, and are regularly distributed without overlapping each other also in the film thickness direction, so that they constitute a single filler (for example, conductive particle) layer in which the positions of the fillers 1 in the film thickness direction are aligned.

A inclination 2b is formed on the surface 2a of the binder resin layer 2 around each filler 1 with respect to the tangential plane 2p of the binder resin layer 2 in the center portion between adjacent fillers. As will be described later, in the filler-containing film of the present invention such as an anisotropic conductive film, an undulation 2c may be formed on the surface of the binder resin layer right above the filler 1 embedded in the binder resin layer 2 (FIG. 2).

The term "inclination" used in the present invention means a state in which the flatness of the surface of the binder resin layer is impaired in the vicinity of the filler 1, and a part of the binder resin layer is lacked with respect to the tangential plane 2p to reduce the resin amount thereby. In other words, the surface of the binder resin layer around the filler in the inclination is lacked with respect to the tangential plane. On the other hand, the term "undulation" used herein means a state in which a waviness is generated on the surface of the binder resin layer right above the filler, and the resin is reduced by the presence of a portion with a height difference such as a waviness. In other words, the amount of the resin in the binder resin layer right above the filler is smaller than that when the surface of the binder resin layer right above the filler is flush with a tangential plane. These can be seen by comparing the portions of the flat surfaces between the fillers with the portions corresponding to the position right above the fillers. It should be noted that the starting point of the undulation may be present as a inclination.

As described above, when the filler-containing film is configured as an anisotropic conductive film, the formation of the inclination 2b (FIB. 1B) around the filler 1 exposed from the binder resin layer 2 reduces the resistance received from the resin due to the flattening of the filler 1 that occurs when the filler 1 is sandwiched between the terminals at the time of anisotropic conductive connection, compared to a case where there is no inclination 2b. Thus, since the fillers are easily held by the terminals, the conduction performance and also the capturing properties are improved. The inclination preferably follows the contour of the filler. This is because, in addition to the fact that the effect in connection is more likely to be exhibited, the fillers can be easily recognized, so that it becomes easier to carry out a test or the like in the production of the filler-containing film such as the anisotropic conductive film or the like. The inclination and undulation may be partially lost by heat pressing the binder resin layer, but the present invention encompasses this case.

In this case, the filler may be exposed at one point on the surface of the resin layer. There are various electronic components to be connected, and as long as tuning is performed according to these, it is desired that the degree of freedom of design be high so as to satisfy various requirements.

Therefore, the anisotropic conductive film can be used even if the inclination or undulation is reduced or partially disappeared.

In addition, since the undulation 2c (FIG. 2) is formed on the surface of the binder resin layer 2 right above the filler 1 which is embedded without being exposed from the binder resin layer 2, the pressing force from the terminal is easily applied to the filler at the time of the anisotropic conductive connection, similarly to the case of the inclination. In addition, since the amount of the resin right above the filler is reduced due to the presence of the undulation compared to the case where the binder resin is deposited flat, the binder resin right above the filler is easily removed at the time of connection, and the terminal and the filler easily come into contact with each other, so that the filler capturing properties at the terminal are improved, and the conduction reliability is improved. In addition, even if the filler-containing film is configured as aspects other than the anisotropic conductive film, the same effect may be obtained.

(Positions of Fillers in Thickness Direction of Binder Resin Layer)

The positions of the fillers 1 in the thickness direction of the binder resin layer 2 in consideration of the viewpoint of "inclination" or "undulation" are such that the fillers 1 may be exposed from the binder resin layer 2 as described above or may be embedded in the binder resin layer 2 without exposure. The ratio (Lb/D) (hereinafter, embedded rate) of the distance Lb of the deepest part of the filler from the tangential plane 2p in the center portion between adjacent fillers (hereinafter referred to as the embedded amount) to the average particle diameter D of the fillers is preferably 60% or more and 105% or less. The fillers 1 may penetrate the binder resin layer 2. When the fillers 1 penetrate the layer, the embedded rate is 100%.

When the embedded rate (Lb/D) is 60% or more, the predetermined particle distributed state or predetermined arrangement of the fillers 1 can be easily maintained by the binder resin layer 2. When the embedded rate is 105% or less, if the filler-containing film is configured as an anisotropic film, the amount of the resin in the binder resin layer (insulating resin layer) which acts to cause the fillers (conductive particles) between the terminals to flow unnecessarily at the time of anisotropic conductive connection can be reduced. Even if the filler-containing film is configured as aspects other than the anisotropic conductive film, the same effect may be obtained.

Note that the numerical value of the embedded rate (Lb/D) means that 80% or more, preferably 90% or more, more preferably 96% or more, and further more preferably 99% or more of the entire fillers (for example, conductive particles) contained in the filler-containing film such as an anisotropic conductive film satisfy the numerical value of the embedded rate (Lb/D). Therefore, the embedded rate of 60% or more and 105% or less means that the embedded rate of 80% or more, preferably 90% or more, more preferably 96% or more, and further more preferably 99% or more of the entire fillers (the entire conductive particles) contained in the filler-containing film such as an anisotropic conductive film or the like is 60% or more and 105% or less. Since the embedded rates (Lb/D) of all the fillers are uniform in this manner, the load of the pressing force is uniformly applied to the fillers, so that a capturing state of the fillers by terminals becomes favorable, and the conduction stability is improved when the filler-containing film is configured as an anisotropic conductive film. Even if the filler-containing film is configured as aspects other than the anisotropic conductive film, the same effect may be obtained.

The embedded rate (Lb/D) can be determined by arbitrarily extracting 10 or more regions having a region of 30 mm$^2$ or more from the filler-containing film such as an anisotropic conductive film, observing a part of a cross section of the film with the use of SEM images, and measuring 50 or more conductive particles. In order to improve the accuracy, 200 or more fillers may be measured to determine the embedded rate.

The measurement of the embedded rate (Lb/D) may be determined collectively for a certain number of particles by adjusting the focus in the surface field images. Alternatively, a laser type discrimination sensor (manufactured by Keyence Corporation or the like) may be used for measuring the embedded rate (Lb/D).

As a more specific embedded aspect of the fillers 1 having an embedded rate (Lb/D) of 60% or more and 105% or less, an aspect may be mentioned in which the fillers 1 are embedded at an embedded rate of 60% or more and less than 100% such that the fillers 1 are exposed from the binder resin layer 2 as in the anisotropic conductive film 10A shown in FIG. 1B. The filler-containing film 10A has inclinations 2b in which portions of the surface of the binder resin layer 2 in contact with the fillers 1 exposed from the resin layer 2 and the vicinity thereof become ridge lines substantially along the outer shapes of the fillers with respect to the tangential plane 2p in the surface 2a of the insulating resin layer in the center portion between the adjacent fillers.

When the filler-containing film 10A such as an anisotropic conductive film is produced by pushing the fillers 1 into the binder resin layer 2, the inclinations 2b or the undulations 2c described later can be formed by adjusting the lower limit of the viscosity at the time of pushing the fillers 1 to 3000 Pa·s or more, more preferably 4000 Pa·s or more, and further preferably 4500 Pa·s or more, and the upper limit thereof to 20000 Pa·s or less, more preferably 15000 Pa·s or less, and further preferably 10000 Pa·s or less. Furthermore, such a viscosity is preferably exhibited at 40 to 80° C., more preferably at 50 to 60° C. Note that the inclinations 2b or the undulations 2c may be partially lost by heat pressing the binder resin layer, the inclinations 2b may be transformed to the undulations 2c, and the fillers having the undulations 2c may be exposed from the binder resin layer 2 at one point on the top thereof.

From the viewpoint of facilitating obtaining of the effects of the inclination 2b (FIG. 1B) of the binder resin layer 2 around the exposed portions of the filler and the undulation 2c (FIG. 2) of the binder resin layer right above the filler, the ratio (Lh/D) of the maximum depth Lh of the inclination 2b to the average particle diameter D of the fillers 1 is preferably less than 50%, more preferably less than 30%, and more preferably 20% to 25%, the ratio (Lg/D) of the maximum diameter Lg of the inclination 2b or the undulation 2c to the average particle diameter D of the fillers 1 is preferably 100% or more, and more preferably 100% to 150%, and the ratio (Lf/D) of the maximum depth Lf of the undulation 2c to the average particle diameter D of the fillers 1 is greater than 0, preferably less than 10%, and more preferably 5% or less.

The diameter Lc of the exposed (right above) part of the filler 1 at the inclination 2b or the undulation 2c can be smaller than or equal to the average particle diameter D of the fillers 1, and is preferably 10 to 90% of the average particle diameter D. In addition, the top portion of the filler 1 may be exposed at one point, and the filler 1 may be completely embedded in the binder resin layer 2 so that the diameter Lc is zero.

In the present invention described above, the presence of the inclination 2b and the undulation 2c on the surface of the binder resin layer 2 can be confirmed by observing a cross section of a filler-containing film such as an anisotropic conductive film with a scanning electron microscope, and can also be confirmed by surface field observation. The inclination 2b and the undulation 2c can also be observed by an optical microscope or a metallurgical microscope. Further, the size of the inclination 2b and the undulation 2c can be confirmed by adjusting the focus at the time of observing images. The same operation can be applied to the cases even after the inclination or undulation is reduced by the heat press as described above. This is because traces may remain.

(Composition of Binder Resin Layer)

The binder resin layer 2 may be conductive or insulative and may be plastic or curable depending on the use application of the filler-containing film. However, the binder resin layer 2 may preferably be formed from an insulating curable resin composition, for example, a thermo-polymerizable composition containing a thermo-polymerizable compound and a thermal polymerization initiator. The thermo-polymerizable composition may contain a photopolymerization initiator as necessary. These may use a known resin composition, curable agent and initiator. A description will next be given of a case of an insulating resin for an anisotropic conductive film as one aspect of the filler-containing film.

When a thermal polymerization initiator and a photopolymerization initiator are used in combination, a thermo-polymerizable compound which also functions as a photopolymerizable compound may be used as the thermo-polymerizable compound, or a photopolymerizable compound may be contained separately from the thermo-polymerizable compound. A photopolymerizable compound is preferably contained separately from the thermo-polymerizable compound. For example, a thermal cationic curing initiator is used as the thermal polymerization initiator, an epoxy compound is used as the thermo-polymerizable compound, a photoradical polymerization initiator is used as the photopolymerization initiator, and an acrylate compound is used as the photopolymerizable compound.

As the photopolymerization initiator, a plurality of types which react with light having different wavelengths may be contained. As a result, it is possible to selectively use wavelengths used for light curing of the resin constituting the binder resin layer and for light curing used for bonding a filler-containing film to an adherend (for example, light curing of the resin for bonding the electronic components to each other at the time of anisotropic conductive connection) at the time of producing the filler-containing film.

In the photocuring at the time of producing the filler-containing film, all or part of the photopolymerizable compound contained in the binder resin layer can be photocured. By this photocuring, the disposition of the fillers 1 in the binder resin layer 2 is held or fixed. In addition, the viscosity of the binder resin layer in the production process of the filler-containing film may be appropriately adjusted by this photocuring. In particular, the photocuring is preferably performed when the ratio (La/D) between the layer thickness La of the binder resin layer 2 and the average particle diameter D of the fillers 1 is less than 0.6. This is because, even when the layer thickness of the binder resin layer 2 is thin with respect to the average particle diameter D of the fillers 1, the disposition of the fillers 1 is more reliably held or fixed in the binder resin layer 2, and the viscosity of the binder resin layer 2 is adjusted to suppress a decrease in yield in connection between the filler-containing film and an adherend.

The mixed amount of the photopolymerizable compound in the binder resin layer is preferably 30% by mass or less, more preferably 10% by mass or less, and still more preferably less than 2% by mass. This is because when the amount of the photopolymerizable compound is excessively large, the thrust of the pushing-in applied at the time of thermocompression bonding of the filler-containing film to an adherend increases. This is particularly preferable in the case of anisotropic conductive connection. This is because the resin flow and the pushing-in of the conductive particles are simultaneously achieved.

Examples of the thermo-polymerizable composition may include a thermal radical polymerizable acrylate-based composition containing a (meth)acrylate compound and a thermal radical polymerization initiator, and a thermal cationic polymerizable epoxy-based composition containing an epoxy compound and a thermal cationic polymerization initiator. Instead of the thermal cationic polymerizable epoxy-based composition containing the thermal cationic polymerization initiator, a thermal anionic polymerizable epoxy-based composition containing a thermal anionic polymerization initiator may be used. Furthermore, a plurality of types of polymerizable compositions may be used in combination as long as they do not cause any particular problem. Examples of the combination may include a combination of a cationic polymerizable composition and a radical polymerizable composition.

As the (meth)acrylate compound, a conventionally known thermo-polymerizable (meth)acrylate monomer can be used. For example, monofunctional (meth)acrylate-based monomers, bifunctional or more polyfunctional (meth)acrylate-based monomers may be used.

Examples of the thermal radical polymerization initiator may include an organic peroxide, and an azo compound. In particular, an organic peroxide which does not generate nitrogen, which causes bubbles, may preferably be used.

The amount of the thermal radical polymerization initiator used is preferably 2 to 60 parts by mass, and more preferably 5 to 40 parts by mass, with respect to 100 parts by mass of the (meth)acrylate compound, since too small an amount of the thermal radical polymerization initiator leads to poor curing and too large an amount of the thermal radical polymerization initiator leads to a decrease in product life.

Examples of the epoxy compound may include a bisphenol A type epoxy resin, a bisphenol F type epoxy resin, a novolac type epoxy resin, modified epoxy resins of these, and an alicyclic epoxy resin. Two or more of these resins may be used in combination. In addition to the epoxy compound, an oxetane compound may be used in combination.

As the thermal cationic polymerization initiator, any known thermal cationic polymerization initiator of an epoxy compound may be adopted, and examples thereof used may include an iodonium salt, a sulfonium salt, a phosphonium salt, and a ferrocene, which generate an acid by heat. In particular, an aromatic sulfonium salt which exhibits good latency with respect to temperature may preferably be used.

The amount of the thermal cationic polymerization initiator used is preferably 2 to 60 parts by mass, and more preferably 5 to 40 parts by mass, with respect to 100 parts by mass of the epoxy compound, since too small an amount of the thermal cationic polymerization initiator tends to cause poor curing, and too large an amount thereof tends to lower the product life.

The thermo-polymerizable composition preferably contains a film forming resin or a silane coupling agent. Examples of the film forming resin may include a phenoxy resin, an epoxy resin, an unsaturated polyester resin, a saturated polyester resin, a urethane resin, a butadiene resin, a polyimide resin, a polyamide resin, and a polyolefin resin, and two or more of these resins may be used in combination. Of these, a phenoxy resin may preferably be used from the viewpoints of film forming property, processability, and connection reliability. The weight-average molecular weight is preferably 10,000 or more. Examples of the silane coupling agent may include an epoxy-based silane coupling agent, and an acrylic silane coupling agent. These silane coupling agents are primarily alkoxysilane derivatives.

In order to adjust the melt viscosity, the thermo-polymerizable composition may contain an insulating filler in addition to the filler 1 described above. Examples of the insulating filler may include silica powder, and alumina powder. A fine filler having an insulating filler particle diameter of 20 to 1000 nm is preferable, and the mixed amount is preferably 5 to 50 parts by mass with respect to 100 parts by mass of a thermo-polymerizable compound (photopolymerizable compound) such as an epoxy compound. The insulating filler to be contained separately from the filler 1 is preferably used when the use application of the filler-containing film is an anisotropic conductive film, but may not be insulative depending on the use application, and may contain, for example, a conductive minute filler. When the filler-containing film is configured as an anisotropic conductive film, the resin layer forming the filler distributed layer may appropriately contain a finer insulating filler (so-called nanofiller) different from the filler 1, as necessary.

The filler-containing film of the present invention may contain a filling agent, a softener, an accelerator, an antiaging agent, a colorant (pigment, dye), an organic solvent, an ion catcher agent, or the like, in addition to the above-mentioned insulating or conductive filler.

<Layer Thickness of Binder Resin Layer>

The layer thickness La of the binder resin layer 2 is preferably determined according to the average particle diameter D of the fillers 1, and as shown in FIGS. 1A and 1B, when the resin layer in the filler-containing film is formed of a binder resin single layer, if the ratio (La/D) is small and the amount of the resin is too small, it becomes difficult to maintain the disposition of the fillers 1 in a predetermined distributed state or in a lattice form. Therefore, in the present invention, the ratio is 0.5 or more, preferably 0.6 or more, and more preferably 0.7 or more. On the other hand, if this ratio (La/D) becomes large and the amount of the resin becomes too large, the influence of the protrusion tends to occur. Therefore, in the present invention, the ratio is 2 or less, preferably 1.6 or less, and more preferably less than 1.3.

In addition, the positional relationship of the binder resin layer 2 and the filler 1 in the film thickness direction may be configured such that the fillers 1 are exposed from one of the surfaces of the binder resin layer 2 as shown to FIG. 1B. The fillers 1 may be embedded in the binder resin layer 2 without exposing the fillers 1 from both front and back surfaces of the binder resin layer 2 like the filler-containing film 10B shown in FIG. 2. The fillers 1 may be exposed from both the front and back surfaces of the binder resin layer 2 like the filler-containing film 10C shown in FIG. 3. In these cases, of the front and back film surfaces of the binder resin layer 2, the film surface closer to the fillers 1 and the fillers 1 are preferably flush with each other.

<Second Resin Layer>

Figure 4:
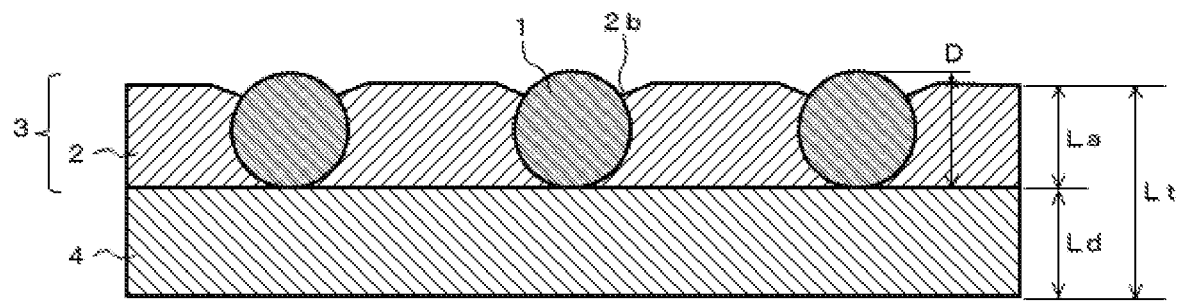
FIG. 4 is a cross-sectional view of a filler-containing film 10D.
Figure 5:
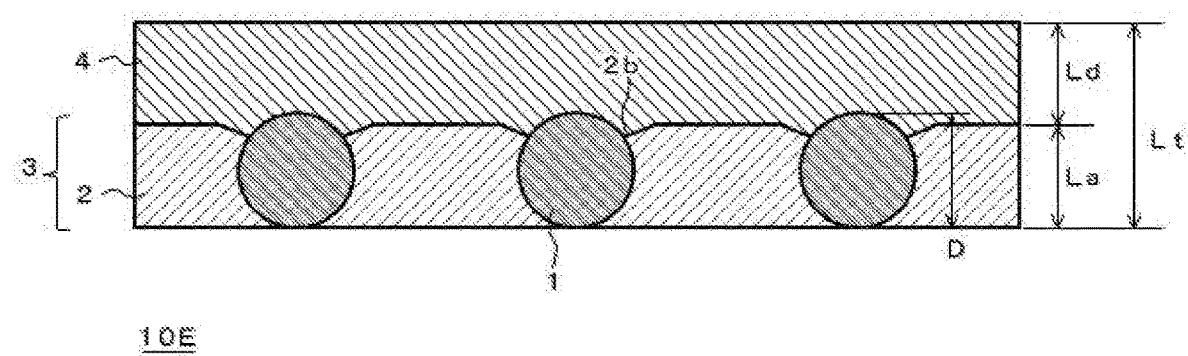
FIG. 5 is a cross-sectional view of a filler-containing film 10E.

In the filler-containing film of the present invention, a second resin layer 4 preferably having a minimum melt viscosity lower than that of the binder resin layer 2 may be laminated on the binder resin layer 2, as necessary, like the filler-containing film 10D shown in FIG. 4 or the filler-containing film 10E shown in FIG. 5.

In this case, it is preferable that the total thickness Lt of the resin layer, which is the total of the layer thickness La of the binder resin layer 2 and the layer thickness Ld of the second resin layer 4, be 0.5 times or more and 2 times or less of the average particle diameter D of the fillers 1. Herein, the aspect in which the lower limit is 0.5 times means that the aspect encompasses a case in which the second resin layer is infinitely thin. If Lt falls within this range, a third resin layer having a minimum melt viscosity lower than, or equal to, that of the binder resin layer may be provided as in the case of the second resin layer. The third resin layer may be provided on the surface of the binder resin layer opposite to the second resin layer, or may be laminated on the second resin layer. Laminating a layer having a different minimum melt viscosity from the binder resin layer or the second resin layer can appropriately adjust the properties of the filler-containing film. In the case of an anisotropic conductive film which is one aspect of the filler-containing film, filling of the space between the terminals with a resin can be performed as appropriate, and improvement of the bonding strength can be expected. In use applications other than anisotropic conductive film, similar effects are expected in the surface state of the articles to be connected.

On the other hand, as the resin layer of the filler-containing film, a binder resin layer having a different disposition of fillers may be laminated. The minimum melt viscosities of the laminated binder resin layers having different dispositions of fillers may be equal to or different from each other. In addition, a resin layer containing no filler may be interposed therebetween as in the above-described second resin layer, and a second resin layer or a third resin layer may be provided in the outermost layer. This may be done to adjust the thickness of the filler-containing film itself, or to adjust the positions of the fillers that are brought into contact with only one of articles or the positions of the fillers between articles (not brought into contact with both the articles).

Figure 6:
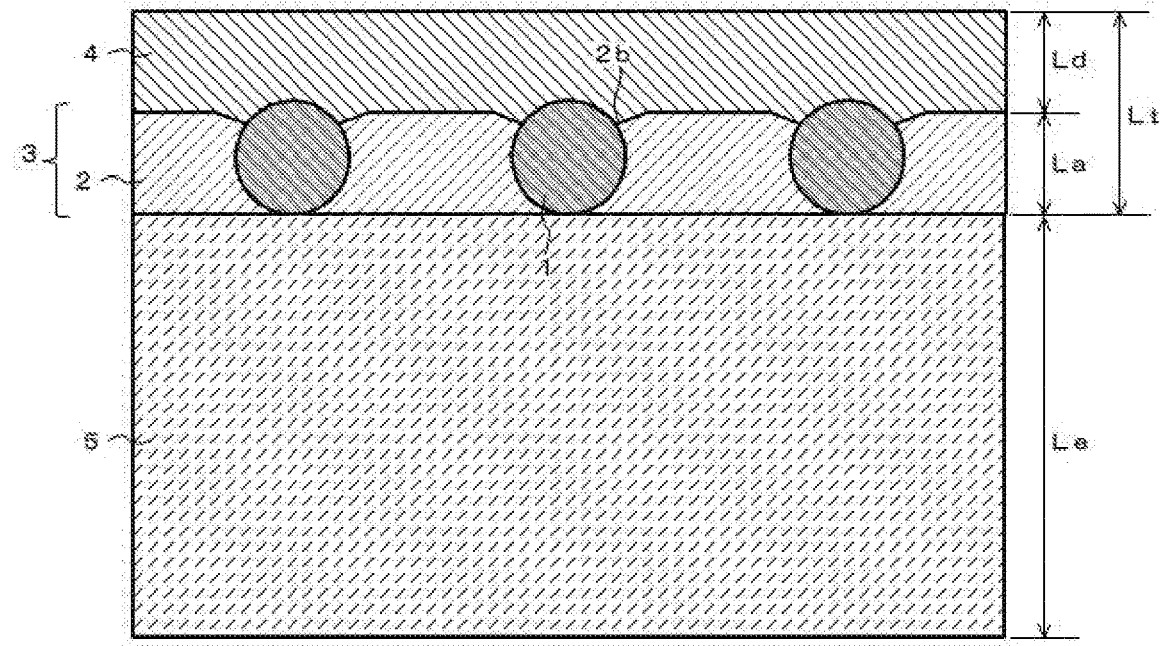
FIG. 6 is a cross-sectional view of a filler-containing film 10F.

In addition, a base film 5 may be provided as in the case of the filler-containing film 10F shown in FIG. 6. The base film 5 may function as a functional film or a release film. Since the base film 5 need not be a release film, the present invention includes an aspect in which the base film 5 (functional film) and the filler-containing film 10 are integrally formed with each other. Similarly, an aspect in which the base film 5 and the filler-containing film 10 are not integrally formed (the filler-containing film does not include the base film) is also included. Examples of the functional film may include a film having an optical function, and a film having a conductive pattern on a surface thereof (e.g., a film on which an electrode pattern for a touch sensor is formed). The functional film may also be referred to as a film that exhibits an effect by the physical properties of the film alone. Combining a functional film which is the base film and the filler-containing film can appropriately adjust the use application by improving the function or imparting a complex function. For example, a film provided with an electrode pattern for a touch sensor may be combined with a filler-containing film having characteristic optical properties.

The base film 5 may be formed from a known thermoplastic resin film such as, but not limited to, a PET (Poly Ethylene Terephthalate) film. In addition to PET, OPP (Oriented Polypropylene), PMP (Poly-4-methylpentene-1), PTFE (Polytetrafluoroethylene), and the like are exemplified. Further, if the base film has a tensile elastic modulus equivalent to these, it can function as a supporting layer for the binder resin layer.

The thickness Le of the base film 5 is preferably 20 µm or more and 100 µm or less, more preferably 25 µm or more and 85 µm or less, and still more preferably 30 µm or more and 80 µm or less, from the viewpoint of handleability. Further, if the thickness Le of the base film 5 is sufficiently large with respect to the total thickness Lt of the resin layer, it is possible to reduce resin protrusion and eliminate the problem of the protrusion of the resin layer. Therefore, as an example, the thickness Le of the base film 5 is preferably 10 times or less, and more preferably 4 times or less, the total thickness Lt of the resin layer (the thickness La of the filler-containing layer 2 in the case where the second resin layer is not provided). On the other hand, if the base film 5 is excessively thick, the material is wasted, and it is difficult to sufficiently secure the entire length of the filler-containing film in one wound body. Therefore, it is preferable that the thickness Le of the base film 5 be 2 times or more the total thickness Lt of the resin layer (the layer thickness La of the binder resin layer 2 in the case where the second resin layer is not provided).

That is, in the present invention, when the filler-containing film 10F is configured as an anisotropic conductive film, if the total thickness Lt of the resin layer (the binder resin layer 2 and the second resin layer 4) is relatively thin with respect to the base film 5, the resin protrusion itself is suppressed, and an effect of reducing the influence of the resin protrusion can be expected. In addition, when the base film 5 is thinned, the film thickness of the filler-containing film becomes thinner. Therefore, in the case of the wound body, even if the diameter of the wound body is the same as that of the known anisotropic conductive film, the film length can be made longer than that of the known anisotropic conductive film. This is not limited to anisotropic conductive films.

<Total Thickness of Resin Layer>

Figure 3:
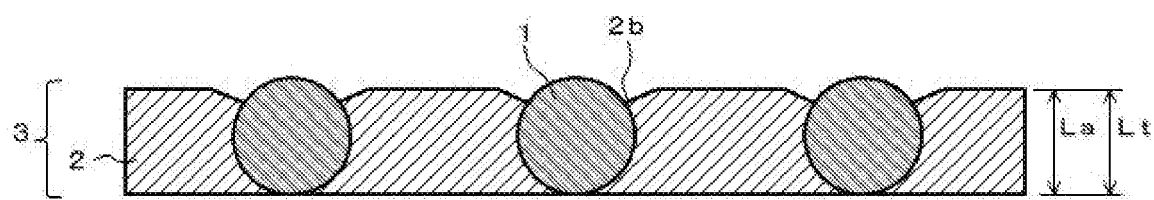
FIG. 3 is a cross-sectional view of a filler-containing film 10C.

In the filler-containing film of the present invention, the lower limit of the total thickness Lt of the resin layer is preferably 0.5 times or more, 0.6 times or more, and 0.7 times or more, the average particle diameter D of the fillers 1, and the upper limit is preferably 2 times or less, 1.6 times or less, and 1.3 times or less, the average particle diameter D of the fillers 1. When the total thickness Lt of the resin layer is less than 1 times the average particle diameter D of the fillers 1, the filler 1 may penetrate the resin layer. Here, the total thickness Lt of the resin layer refers to the thickness of the binder resin layer 2 when the filler-containing films 10A, 10B, and 10C have only the binder resin layer 2 as the resin layer, as shown in FIGS. 1B, 2, and 3. When the second resin layer 4 is laminated as necessary as shown in FIG. 4 or FIG. 5, the total thickness Lt of the resin layer refers to the total thickness of the binder resin layer 2 and the second resin layer 4. On the other hand, when the base film 5 is provided as the release film as shown in FIG. 6, the total thickness Lt of the resin layer does not include the thickness of the base film 5. The same applies to the case where the base film 5 is provided as a functional film.

Assuming that the filler 1 is a sphere, when the relationship between the total thickness Lt of the resin layer of the filler-containing film and the average particle diameter D of the fillers 1 is defined as described above, the content of the filler in the filler-containing film is preferably 1.2 vol % or more and 45 vol % or less. On the other hand, the area occupancy rate of the filler in the surface field of view of the filler-containing film is preferably 0.1% or more and 35% or less.

<Production Method of Filler-Containing Film>

When the filler-containing film of the present invention is formed from a single layer of the filler distributed layer 3, the filler-containing film can be produced, for example, by holding the fillers 1 in a predetermined arrangement on the surface of the binder resin layer 2 and pressing the fillers 1 into the binder resin layer 2 with a flat plate or a roller.

Herein, the embedded amount of the fillers 1 in the binder resin layer 2 can be adjusted by pressure and temperature when the fillers 1 are pushed in, and the presence or absence, shape, and depth of the concave 2b, 2c can be adjusted by the viscosity, pushing-in speed, temperature, etc. of the binder resin layer 2 when the fillers are pushed in.

The method of holding the fillers 1 in the binder resin layer 2 is not particularly limited, but, for example, a transfer mold is used to hold the fillers 1 in the binder resin layer 2. As the transfer mold, for example, those obtained by forming openings in a transfer mold material of an inorganic material such as a metal such as silicon, various ceramics, glass, or stainless steel, or an organic material such as various resins by a known opening forming method such as a photolithography method can be used. The transfer mold may have a plate shape, a roll shape, or the like.

From the viewpoint of economy in use of the filler-containing film, it is preferable that the filler-containing film should have a certain length. Thus, the length of the filler-containing film is preferably 5 m or more, more preferably 10 m or more, and even more preferably 25 m or more.

On the other hand, if the filler-containing film is excessively long, a conventional apparatus cannot be used as an apparatus used when the filler-containing film is bonded to an adherend, and the handling property is also bad. Therefore, the filler-containing film is preferably produced to have a length of 5000 m or less, more preferably 1000 m or less, and even more preferably 500 m or less. Such a long-length body of the filler-containing film is preferably a wound body wound around a winding core from the viewpoint of excellent handleability. The film width is not particularly limited, but from the viewpoint of the operability of winding and drawing, the lower limit is preferably 0.3 mm or more, more preferably 0.5 mm or more, and still more preferably 0.6 mm or more. The upper limit may be 600 mm or less. However, if the absolute value of the resin amount is excessively increased, there is a concern that the protrusion amount may be increased in the long-length film. Thus, the upper limit is preferably 70 mm or less, more preferably 50 mm or less, and still more preferably 30 mm or less.

<Method of Using Filler-Containing Film>

The filler-containing film of the present invention can be used in the same manner as the conventional filler-containing film, and the article is not particularly limited as long as the filler-containing film can be bonded thereto. The filler-containing film can be bonded to a variety of articles according to the use application by pressure bonding, preferably by thermocompression bonding. Light irradiation may be used at the time of bonding, or heat and light may be used in combination. For example, when the resin layer of the filler-containing film has sufficient adhesion to an article to which the filler-containing film is bonded, a film bonded body in which the filler-containing film is bonded to the surface of one article can be obtained by lightly pressing the resin layer of the filler-containing film against the article. In this case, the surface of the article is not limited to a flat surface, and may have unevenness or may be bent as a whole. If the article is in a film or flat plate shape, a pressure-bonding roller may be used to bond the filler-containing film to the article. This may also directly bond the fillers of the filler-containing film to the article. In the case where the filler-containing film and the base film (functional film) are integrally formed with each other, the functionality can be imparted by simply bonding them to each other in this manner. For example, a filler-containing film in which conductive particles are used as the filler is provided on a surface of a base film (functional film) on which an electrode pattern is provided, and a functional film in which a different electrode pattern is provided is bonded to the filler-containing film, whereby a conductive path can be formed.

Furthermore, the filler-containing film may be interposed between two opposing articles, and two opposing articles may be joined by a thermocompression roller or a thermocompression tool, so that the fillers may be sandwiched between the articles. The filler-containing film may also be sandwiched between the articles such that the fillers and the articles are not in direct contact with each other.

In particular, when the filler-containing film is configured as an anisotropic conductive film, the filler-containing film can be preferably used for anisotropic conductive connection between a first electronic component such as an IC chip, an IC module, or an FPC and a second electronic component such as an FPC, a glass substrate, a plastic substrate, a rigid substrate, or a ceramic substrate via the anisotropic conductive film using a thermocompression bonding tool. An IC chip or a wafer may be stacked using an anisotropic conductive film to be multilayered. The electronic components to be connected by the anisotropic conductive film of the present invention are not limited to the electronic components described above. The anisotropic conductive film can be used for various electronic components that have been diversified in recent years.

Accordingly, the present invention encompasses a connection structure in which various articles (e.g., a first article and a second article) are bonded together by pressure bonding with the filler-containing film of the present invention, and a method for producing the same. In particular, in the case where the filler-containing film is configured as an anisotropic conductive film, the present invention also encompasses a method for producing a connection structure in which electronic components (first electronic component and second electronic component) are anisotropically conductively connected to each other by using the anisotropic conductive film, and a connection structure obtained thereby, that is, a connection structure in which the electronic components are anisotropically conductively connected to each other by the anisotropic conductive film of the present invention.

As the method for connecting an electronic component using an anisotropic conductive film, when the anisotropic conductive film is composed of a single layer of the conductive particle distributed layer 3, the anisotropic conductive film is temporarily pressure bonded to the second electronic component such as various substrates from the side where the conductive particles 1 of the anisotropic conductive film are embedded in the surface, and the first electronic component such as an IC chip or the like is attached to the anisotropic conductive film on the side where the conductive particles 1 are not embedded in the surface of the temporarily pressure bonded anisotropic conductive film, followed by thermocompression bonding to produce a connection structure.

In the case where the insulating resin layer of the anisotropic conductive film contains not only a thermal polymerization initiator and a thermo-polymerizable compound but also a photopolymerization initiator and a photopolymerizable compound (which may be the same as the thermo-polymerizable compound), a pressure bonding method using both light and heat may be used. In this manner, unintended movement of the conductive particles can be prevented as small as possible. Further, the side where the conductive particles are not embedded may be temporarily bonded to the second electronic component. The anisotropic conductive film may be temporarily bonded to the first electronic component instead of the second electronic component.

In the case where the anisotropic conductive film is formed from a laminate of the conductive particle distributed layer 3 and the second resin layer 4, the conductive particle distributed layer 3 is temporarily bonded to the second electronic component such as various substrates to be temporarily pressure bonded, and the first electronic component such as an IC chip is aligned and mounted on the second resin layer 4 side of the temporarily pressure bonded anisotropic conductive film and thermocompression bonded. The anisotropic conductive film may be temporarily bonded to the first electronic component from the second resin layer 4 side thereof. In addition, the anisotropic conductive film may be temporarily bonded to the first electronic component from the conductive particle distributed layer 3 side thereof for use.

EXAMPLE

A specific description will now be given of the anisotropic conductive film which is one aspect of the filler-containing film of the present invention by way of examples.

Examples 1 to 4 and Comparative Examples 1 to 4

(1) Production of Anisotropic Conductive Film

A resin composition for forming an insulating resin layer, which forms a conductive particle distributed layer, was prepared by the formulation shown in Table 1. The minimum melt viscosity of the insulating resin layer was 3000 Pa·s or more. This resin composition was applied onto a PET film having a film thickness of 50 μm by a bar coater, and dried in an oven at 80° C. for 5 minutes, so that an insulating resin layer having a film thickness shown in Table 2 was formed on the PET film.

TABLE 1

| | Formulation of Insulating Resin Layer | Parts by mass |
|---|---|---|
| Examples 1, 2 | Phenoxy Resin (Nippon Steel & Sumikin Chemical Co., Ltd., YP-50) | 40 |
| Comparative Examples 1, 2 | Silica Filler (Nippon Aerosil Co., Ltd., Aerosil R805) | 25 |
| | Liquid Epoxy Resin (Mitsubishi Chemical Co., Ltd., jER828) | 30 |
| | Silane Coupling Agent (Shin-Etsu Chemical Co., Ltd., KBM-403) | 2 |
| | Thermal Cationic Polymerization Initiator (Sanshin Chemical Industry Co., Ltd., SI-60L) | 3 |
| Examples 3, 4 | Bifunctional Acrylate (Shin-Nakamura Chemical Co., Ltd., A-200) | 30 |
| Comparative Examples 3, 4 | Phenoxy Resin (Nippon Steel & Sumikin Chemical Co., Ltd., YP-50) | 40 |
| | Urethane Acrylate (Shin-Nakamura Chemical Co., Ltd., U-2PPA) | 20 |
| | Phosphate-type Acrylate (Nippon Kayaku Co., Ltd., PM-2) | 5 |
| | Aliphatic Diacyl Peroxide (NOF Corporation, Peroyl L) | 3 |
| | Benzoyl Peroxide (NOF Corporation, Nyper BW) | 2 |

On the other hand, a mold was produced such that conductive particles having an average particle diameter shown in Table 2 were arranged in a hexagonal lattice arrangement or a square lattice arrangement in a plan view (an angle of the arrangement axis with the film long-side direction was 30°), and that the number density was a value shown in Table 2. Pellets of a known transparent resin were melted and poured into this mold, and cooled and solidified to form a resin mold having concave portions in the arrangement pattern of hexagonal lattice or square lattice.

Conductive particles were filled in the concave portions of the resin mold, and the above-described insulating resin layer was placed thereover and bonded thereto by pressing at 60° C. and 0.5 MPa. Then, the insulating resin layer was peeled off from the mold, and the conductive particles on the insulating resin layer were pushed into the insulating resin layer under (the pressing condition: 60 to 70° C., 0.5 MPa) to form the conductive particle distributed layer (Examples 1 to 4). As the conductive particles having the average particle diameter shown in Table 2, Examples 1 and 2 used conductive particles having average particle diameter of 3 μm (AUL703 manufactured by Sekisui Chemical Co., Ltd.) and Examples 3 and 4 used conductive particles having the average particle diameter of 20 μm (Au/Ni plated particles manufactured by Nippon Chemical Industrial CO., LTD.).

In Comparative Examples 1 to 4, the conductive particles were mixed with the resin composition forming the insulating resin layer shown in Table 1 to form an insulating resin layer (number density: 60,000 particles/mm$^2$) in which the conductive particles were randomly dispersed in a single layer.

(2) Evaluation

The anisotropic conductive films of the examples and comparative examples which were produced in (1) were evaluated by performing (a) consistency of inter-particle distance, (b) protrusion test, (c) connection test for COG, and (d) connection test for FOG in the following manners. The results are shown in Table 2.

(a) Consistency of Inter-Particle Distance

One hundred shortest distances of inter-lattice distances between fillers arranged in a lattice form at each of one end and the other end of the anisotropic conductive film were measured by using images taken in a surface field of view with a metallurgical microscope, and a minimum inter-filler distance Lp at one end and a minimum inter-filler distance Lq at the other end were determined to determine the ratio Lq/Lp. In addition, in order to obtain the above-mentioned ratio (Lmax/Lmin), 20 observation regions of 200 μm×200 μm per portion were arbitrarily extracted while the areas were intentionally shifted in the long-side direction of the film to serve as a total observation region. The ratios (Lmax/Lmin) in the respective observation regions were averaged. The case where the ratio Lq/Lp is 1.2 or less and the ratio (Lmax/Lmin) is in the range of 1 or more and 1.2 or less is evaluated as OK, and the case where the ratios are not satisfied is evaluated as NG.

(b) Protrusion Test

Figure 7:
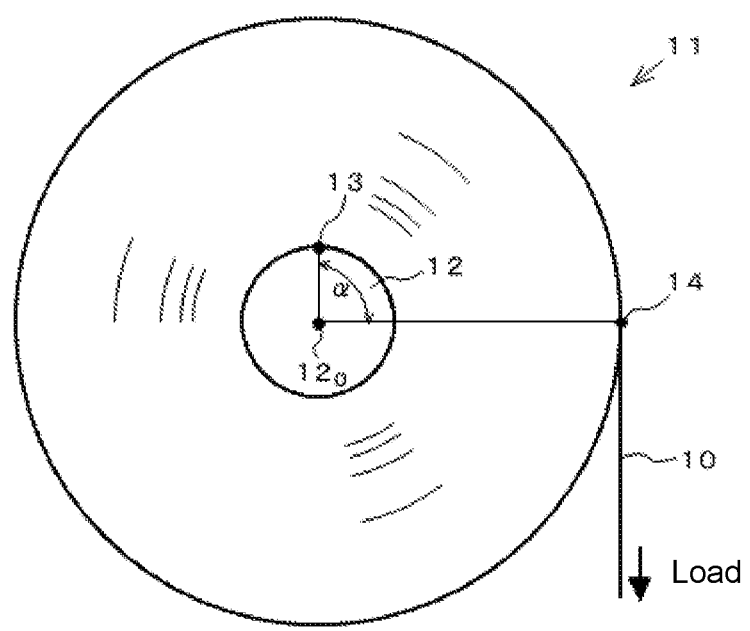
FIG. 7 is a view describing a test method for a protrusion test.

An anisotropic conductive film having the width and length shown in Table 2 was wound around a winding core (diameter of 85 mm) with a tension of 10 g applied thereto so that the anisotropic conductive film was placed to the inner peripheral side of the PET film to form a wound body. As shown in FIG. 7, an angle α formed between a straight line connecting the winding core center $12_0$ and the joint portion 13 between the winding core 12 and the anisotropic conductive film 10 and a straight line connecting the winding core center $12_0$ and the film withdrawal position 14 of the film in the wound body 11 was set at 90°, and a load of 200 g was applied to the withdrawal position 14 of the film while the winding core 12 was fixed to prevent rotation. In this state, they were left at 40° C. for 6 hours. The appearance of the side surface of the wound body 11 was observed using a digital microscope (50 to 200 times), and resin protrusion was evaluated on the basis of the following criteria. There were three observation points, including the point at which the lead of the winding core and the base film were connected.

Evaluation Criteria for Resin Protrusion

The case where the insulating resin layer of the anisotropic conductive film held the PET film and was connected to the insulating resin layer above the layer was referred to as "1.0-layer protruding", and the case where it was connected to the adhesive film layer two layers above was referred to as "2.0-layer protrusion". The number of protruding layers was determined to the first decimal place according to the degree of holding the PET film by the insulating resin layers, and was evaluated on the basis of the following criteria.

OK: 3.0 layers or less at all observation points

NG: a case where there are more than 3.0 layers even in one portion (c) Connection Test for COG (c1) Initial Conduction Resistance Using an anisotropic conductive film of each of Examples 1 and 2 and Comparative Examples 1 and 2 that was cut to have a sufficient area, an IC for evaluation and a glass substrate described below were heated and pressed through the anisotropic conductive film at 180° C. and 60 MPa, and for 5 seconds to obtain a connection article for evaluation. At this time, the thrust required for the pressing jig was 125 N.

IC for Evaluation:

Outer shape long side: 20 mm, short side: 90% the film width

Thickness 0.5 mm

Bump specification: size 30×85 μm, inter-bump distance 10 μm, bump height 3 μm, number of bumps 820

Glass Substrate

Glass material: 1737F manufactured by Corning Incorporated

Outer shape 30×50 mm

Thickness 0.5 mm

Electrode ITO wiring (of which wiring pattern corresponded to the bump specification of the IC)

The initial conduction resistance of the obtained evaluation connection article was measured by a four-terminal method, and evaluated according to the following criteria.

OK: less than 2Ω

NG: 2Ω or more.

(c2) Reliability Test

The evaluation connection article obtained in (c1) was placed in a constant temperature bath at a temperature of 85° C. and a humidity of 85% RH for 500 hours, and then the conduction resistance was measured in the same manner as that in the initial conduction resistance, and evaluated according to the following criteria.

OK: less than 5Ω

NG: 5Ω or more.

(c3) Short Circuit Rate

An IC for evaluation of the short circuit rate as described below was used to obtain an evaluation connection in the same manner as described above. The number of short circuits of the obtained connection article for evaluation was measured to determine the short circuit rate that is the ratio of the number of short circuits measured relative to the number of terminals of the IC for evaluation, and the short circuit rate was evaluated according to the following criteria.

IC for evaluation of short circuit rate (Comb teeth TEG (test element group) with a space of 7.5 μm)

Outer shape 15×13 mm
Thickness 0.5 mm
Bump specification: size 25×140 μm, inter-bump distance 7.5 μm, and bump height 3 μm
Short Circuit Rate Evaluation Criterion
OK: less than 50 ppm
NG: 50 ppm or more (d) Connection Test for FOG (d1) Initial Conduction Resistance Using an anisotropic conductive film of each of Examples 3 and 4 and Comparative Examples 3 and 4 that was cut to have a sufficient area, an evaluation FPC and a glass substrate described below were heated and pressed through the anisotropic conductive film at 200° C. and 5 MPa, and for 5 seconds with a tool width of 1.5 mm to obtain a connection article for evaluation. The initial conduction resistance of the obtained evaluation connection article was measured, and evaluated according to the following criteria.

FPC for Evaluation:
Terminal pitch 100 μm
Terminal width: inter-terminal space=1:1
Thickness of polyimide film/thickness of cupper foil (PI/Cu)=38/20, Sn plating (d3) Short Circuit Rate The same FPC as that for evaluation of the initial conduction test was heated and pressed (200° C., 5 MPa, 5 seconds) against an alkali glass substrate (thickness: 0.7 mm). The number of short circuits of the obtained connection article for evaluation was measured to determine the short circuit rate that is determined from the number of short circuits measured and the number of gaps in the evaluation connection article, and the short circuit rate was evaluated according to the following criteria.

Short Circuit Rate Evaluation Criteria
OK: less than 200 ppm
NG: 200 ppm or more (d4) Bonding Strength The FPC for evaluation of the evaluation connection article obtained in (d1) was cut so that the measurement portion had a 1 cm width, and then a 90° peel test was performed at a peel speed of 50 mm/min, and a force required for peeling off was measured. The measured force was evaluated according to the following criteria.

OK: Bonding strength is 10 N/cm or more
NG: Bonding strength is less than 10 N/cm

TABLE 2

|  | Example 1 | Example 2 | Comparative Example 1 | Comparative Example 2 | Example 3 | Example 4 | Comparative Example 3 | Comparative Example 4 |
|---|---|---|---|---|---|---|---|---|
| Thickness of Binder Resin Layer (μm) | 4 | 4 | 18 | 4 | 26 | 26 | 26 | 26 |
| Particle Diameter (μm) | 3 | 3 | 3 | 3 | 20 | 20 | 20 | 20 |
| Number Density (particles/mm$^2$) | 28000 | 28000 | 60000 | 60000 | 250 | 250 | 450 | 450 |
| Arrangement State | Hexagonal Lattice | Hexagonal Lattice | Random | Random | Square Lattice | Square Lattice | Random | Random |
| Consistency of Inter-particle Distance | OK | OK | NG | NG | OK | OK | NG | NG |
| Protrusion Test |  |  |  |  |  |  |  |  |
| ACF Width (mm) | 2 | 1 | 2 | 2 | 2 | 1 | 2 | 1 |
| ACF Length (m) | 300 | 300 | 300 | 300 | 300 | 300 | 300 | 300 |
| Resin Protrusion | OK | OK | NG | NG | OK | OK | NG | NG |
| Connection Test for COG (bump height of 3 μm) |  |  |  |  |  |  |  |  |
| Initial Conduction | OK | OK | NG | OK |  |  |  |  |
| Conduction Reliability (85° C./85% RH 500 hr) | OK | OK | NG | OK |  |  |  |  |
| Short Ciruit | OK | OK | NG | NG |  |  |  |  |
| Connection Test for FOG (Wiring Height of 8 μm) |  |  |  |  |  |  |  |  |
| Initial Conduction |  |  |  |  | OK | OK | OK | OK |
| Conduction Reliability (85° C./85% RH 500 hr) |  |  |  |  | OK | OK | OK | OK |
| Short Circuit |  |  |  |  | OK | OK | NG | NG |
| Bonding Strength |  |  |  |  | OK | OK | OK | OK |

Glass Substrate
Electrode ITO coating
Thickness 0.7 mm

The conduction resistance of the obtained evaluation connection article was measured by a four-terminal method, and evaluated according to the following criteria.
OK: less than 2Ω
NG: 2Ω or more.

(d2) Conduction Reliability Test

The evaluation connection article obtained in (d1) was placed in a constant temperature bath at a temperature of 85° C. and a humidity of 85% RH for 500 hours, and then the conduction resistance was measured in the same manner as that in the (d1) initial conduction resistance, and evaluated according to the following criteria.
OK: less than 5Ω
NG: 5Ω or more.

From Table 2, in the anisotropic conductive films in Examples 1 and 2 in which the film thickness was 1.3 times the particle diameter and the conductive particles were aligned in a hexagonal lattice, and also in the anisotropic conductive film of Examples 3 and 4 in which the conductive particles were aligned in a square lattice, resin protrusion did not occur when the films were produced in a wound body, and the connection test for COG and the connection test for FOG obtained good results. On the other hand, in Comparative Example 1 in which the film thickness was 6 times the particle diameter and the conductive particles were dispersed randomly, and also in Comparative Examples 2, 3, and 4 in which the film thickness was 1.3 times the particle diameter but the conductive particles were dispersed randomly, the resin was protruded in some cases when it was produced into a wound body, and it can be seen that the short-circuit rate was inferior. Further, in the connection test for COG, it can be seen from Comparative Example 1 that the initial conduction resistance and the conduction reliability were inferior when the ratio of the film thickness to the particle diameter was large. In the case of Comparative Examples 1 to 4, when the conditions for the protrusion test were set to a load of 50 g, 23° C., and standing-still for 3 hours, which were the same levels as those of an actual use, the protrusion evaluation of OK was given. The total terminal height of the obtained connection body was the same as the bump height of the IC for evaluation chip or the height (copper foil thickness) of the Cu wiring of the evaluation FPC.

Moreover, regarding the bonding strength of the connection test for FOG, although the evaluation of OK was given in Examples 3 and 4, the evaluation articles for connection obtained in the initial conduction test (c1) of Examples 1 and 2 had bonding strengths which do not cause trouble in practical use.

In Examples 1 to 4, the consistency of the inter-particle distance was excellent, but this was inferior in Comparative Examples 1 to 4. Therefore, it is considered that the evaluation results of the protrusion test were inferior in Comparative Examples 1 to 4.

Examples 5 and 6

Evaluation tests were performed in the same manner as those in Examples 1 and 2 except that in Examples 3 and 4, the average particle diameter was 10 μm (Au/Ni plating, Nippon Chemical Industrial Co., Ltd.), the thickness of the binder resin layer was 20 μm, and the distance between conductive particles was adjusted to obtain a number density of particles of 1100 particles/mm². As a result, substantially the same results as those in Examples 3 and 4 were obtained for all the evaluation items.

Comparative Examples 5 and 6

An anisotropic conductive film (Comparative Example 5) in which the layer thickness of the binder resin layer in Example 1 was changed to 18 μm which was the same as that in Comparative example 1, and an anisotropic conductive film (Comparative Example 6) in which the layer thickness of the binder resin layer in Example 3 was changed to 50 μm were produced, and the protrusion tests for these films were performed. As a result, evaluations of the resin protrusion in Examples 1 and 3 were superior to those in Comparative Examples 5 and 6.

REFERENCE SIGNS LIST 1 filler or conductive particle
2 binder resin layer or insulating resin layer
3 filler distributed layer or conductive particle distributed layer
4 second resin layer
5 base film
10, 10A, 10B, 10C, 10D, 10E, 10F filler-containing film or anisotropic conductive film
11 wound body
12 winding core
$12_0$ center of winding core
13 joint portion between winding core and anisotropic conductive film
14 film withdrawal position
20 terminal
A lattice axis
D average particle diameter of fillers
La layer thickness of binder resin layer
Lb distance of deepest part of filler
Lc diameter of exposed (right above) part of filler
Ld layer thickness of second resin layer
Le thickness of base film
Lf maximum depth of undulation
Lg maximum diameter of inclination or undulation around exposed (right above) part of filler
Lh maximum depth of inclination around exposed portion of filler
Lt total thickness of resin layer
Lp minimum inter-filler distance at one end of filler-containing film in long-side direction
Lq minimum inter-filler distance at the other end 5 m or more away from the one end in film long-side direction
Lmax maximum distance among distances between filler and filler
Lmin minimum distance among distances between filler and filler

The invention claimed is:

1. A filler-containing film which has a long length and in which fillers are held in a binder resin layer, wherein
an average particle diameter of the fillers is 1 to 50 μm,
a total thickness of the resin layer is 0.5 times or more and 2 times or less the average particle diameter of the fillers,
a ratio Lq/Lp of, relative to a minimum inter-filler distance Lp at one end of the filler-containing film in a long-side direction, a minimum inter-filler distance Lq at the other end at least 5 m away from the one end in the film long-side direction is 1.2 or less, and
a thickness of the filler-containing film is 0.5 times or more and 2 times or less the average particle diameter of the fillers.

2. The filler-containing film according to claim 1, wherein the fillers are regularly distributed.

3. The filler-containing film according to claim 1, wherein the fillers are arranged in a lattice form.

4. The filler-containing film according to claim 1, wherein, when an arbitrary filler P0 and three fillers P1, P2, and P3 in order of proximity to the arbitrary filler P0 are selected, a ratio (Lmax/Lmin) of a maximum distance (Lmax) to a minimum distance (Lmin) among distances L1, L2, and L3 between each of the three fillers P1, P2, and P3 and the filler P0 is 1.0 or more and 1.2 or less.

5. The filler-containing film according to claim 1, wherein the binder resin layer and a base film are laminated on each other, and a thickness of the base film is 2 times or more a layer thickness of the binder resin layer.

6. The filler-containing film according to claim 1, wherein a second resin layer, or a second resin layer and a third resin layer is(are) laminated on the binder resin layer.

7. The filler-containing film according to claim 6, wherein the second resin layer and the third resin layer have a minimum melt viscosity lower than that of the binder resin layer.

8. The filler-containing film according to claim 1, wherein a second resin layer is laminated on the binder resin layer, and a total layer thickness of the resin layer of the binder resin layer and the second resin layer is 0.5 times or more and 2 times or less the average particle diameter of the fillers.

9. The filler-containing film according to claim 1, wherein a content of the fillers is 1.2 vol % or more and 45 vol % or less.

10. The filler-containing film according to claim 1, wherein the filler-containing film has a width of 0.3 mm or more and 70 mm or less and a length of 5 m or more and 5000 m or less and is a wound body wound around a winding core.

11. The filler-containing film according to claim 10, wherein, when a diameter of the wound core is defined as 2R, and when an arbitrary filler P0 and three fillers P1, P2, and P3 in order of proximity to the arbitrary filler P0 are selected in a region with a length of 2πR from one end on the winding core side of the filler-containing film, a ratio (Lmax/Lmin) of a maximum distance (Lmax) to a minimum distance (Lmin) among distances L1, L2, and L3 between each of the three fillers P1, P2, and P3 and the filler P0 is 1.0 or more and 1.2 or less.

12. The filler-containing film according to claim 1, wherein an inclination or an undulation is formed in a surface of the resin layer near the fillers with respect to a tangential plane of the binder resin layer in a center portion between adjacent fillers, the surface of the binder resin layer around the filler in the inclination is lacked with respect to the tangential plane, and an amount of the resin of the binder resin layer right above the filler in the undulation is smaller than that when the surface of the binder resin layer right above the filler is flush with the tangential plane.

13. The filler-containing film according to claim 1, wherein the binder resin layer has a minimum melt viscosity of 2000 Pa·s or more.

14. The filler-containing film according to claim 1, wherein the filler is a conductive particle, and the filler-containing film is used as an anisotropic conductive film.

15. The filler-containing film according to claim 1, wherein the filler-containing film is used in a use other than an anisotropic conductive film.

16. A film bonded body wherein the filler-containing film according to claim 1 is bonded to an article.

17. A connection structure wherein a first article and a second article are connected via the filler-containing film according to claim 1.

18. The connection structure according to claim 17, wherein a first electronic component and a second electronic component are anisotropically conductively connected via the filler-containing film, wherein the filler is a conductive particle, and the filler-containing film is used as an anisotropic conductive film.

19. The connection structure according to claim 18, wherein a total of heights of opposing terminals of the first electronic component and the second electronic component is 2 times or less the particle diameter of the fillers of the filler-containing film.

20. A method for producing a connection structure comprising pressure bonding a first article and a second article via the filler-containing film according to claim 1.

21. The method for producing a connection structure according to claim 20, wherein a first electronic component and a second electronic component are adopted as the first article and the second article, respectively, and a connection structure in which the first electronic component and the second electronic component are anisotropically conductively connected to each other is produced by thermocompression bonding the first electronic component and the second electronic component via the filler-containing film, wherein the filler is a conductive particle, and the filler-containing film is used as an anisotropic conductive film.

22. The method for producing a connection structure according to claim 21, wherein a total of heights of opposed terminals of the first electronic component and the second electronic component is 2 times or less the particle diameter of the fillers of the filler-containing film.

* * * * *